United States Patent
Sakamoto et al.

(10) Patent No.: US 9,006,613 B2
(45) Date of Patent: Apr. 14, 2015

(54) WINDOW GLASS SHEET FITTED WITH SEAL MEMBER

(71) Applicant: Nippon Sheet Glass Co., Ltd., Tokyo (JP)

(72) Inventors: Takumitsu Sakamoto, Tochigi (JP); Haruyoshi Kurogi, Tochigi (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 0 days.

(21) Appl. No.: 13/261,930

(22) PCT Filed: Jan. 29, 2013

(86) PCT No.: PCT/JP2013/000451
§ 371 (c)(1),
(2) Date: Jul. 15, 2014

(87) PCT Pub. No.: WO2013/114855
PCT Pub. Date: Aug. 8, 2013

(65) Prior Publication Data
US 2014/0332519 A1    Nov. 13, 2014

(30) Foreign Application Priority Data

Jan. 31, 2012 (JP) ................. 2012-018880

(51) Int. Cl.
*B60L 1/02* (2006.01)
*H05B 3/86* (2006.01)
*B60J 1/02* (2006.01)
*B60J 10/02* (2006.01)
*F16J 15/02* (2006.01)

(52) U.S. Cl.
CPC ... *H05B 3/86* (2013.01); *B60J 1/02* (2013.01); *B60J 10/02* (2013.01)

(58) Field of Classification Search
USPC .......... 219/203, 202, 214, 218, 219; 277/642, 277/644, 63, 7
See application file for complete search history.

(56) References Cited

U.S. PATENT DOCUMENTS 6,043,782 A    3/2000  Dishart et al.
6,769,700 B2 *  8/2004  Ortmuller et al. ............ 277/642

FOREIGN PATENT DOCUMENTS

FR    2966091 A1    4/2012
JP    01-36336 Y2   11/1989
JP    01036336  *   11/1989

(Continued)

*Primary Examiner* — Shawntina Fuqua
(74) *Attorney, Agent, or Firm* — Marshall & Melhorn, LLC

(57) ABSTRACT

Provided is a window glass sheet fitted with a seal member and incorporated with a device such as a deicer which facilitates the device and the seal member to be installed in a proper manner. The automotive window glass sheet comprises a laminated glass sheet including a first glass sheet and a second glass sheet placed on an outboard side of the first glass sheet, and a seal member fitted on a peripheral part of the laminated glass sheet. The automotive window glass sheet further comprises a cutout formed on an edge of the first glass sheet, an electrode provided on a part of the inboard side of the second glass sheet corresponding to the cutout, a lead wire connected to the electrode and a spacer extending along an edge of the second glass sheet on the inboard side of the second glass sheet in a part thereof corresponding to the cutout and defining a flat and smooth inboard surface, wherein the inboard surface of the spacer is flush with a plane extrapolated from an inboard side of the first glass sheet, and the seal member is attached to a peripheral part of the inboard side of the first glass sheet and is attached to the inboard surface of the spacer in the cutout.

9 Claims, 4 Drawing Sheets

(56) References Cited

FOREIGN PATENT DOCUMENTS

| JP | 09-180769 A | 7/1997 |
| JP | 2003-532574 A | 11/2003 |
| JP | 2010-070414 A | 4/2010 |

* cited by examiner

WINDOW GLASS SHEET FITTED WITH SEAL MEMBER

TECHNICAL FIELD

The present invention relates to a window glass sheet fitted with a seal member, and in particular to an automotive windshield glass sheet fitted with a seal member.

PRIOR ART

An automotive windshield glass sheet is often fitted with a resilient seal member along the peripheral edge thereof to achieve a seal by bringing the seal member in close contact with the vehicle body panel. Such a seal member may be attached to the periphery of the windshield glass sheet by directly molding the seal member on the peripheral edge by insert molding, or by bonding a separately molded seal member to the peripheral edge by using a bonding agent or an adhesive tape. See Patent Document 1, for instance. The seal member disclosed in Patent Document 1 is provided with a part which is connected to a cowl top to enclose a cowl box defined between the lower edge of the windshield glass sheet and the rear edge of the engine hood.

PRIOR ART DOCUMENT(S)

Patent Document(s)

Patent Document 1: JP2003-532574A

SUMMARY OF THE INVENTION

Task to be Accomplished by the Invention

However, the peripheral part of the inboard side of the glass sheet may not demonstrate a smooth glass surface that will allow a favorable bonding attachment. For instance, in the case of a windshield laminated glass sheet including an inboard glass sheet and an outboard glass sheet, and having a device such as a deicer and a defogger interposed between these two glass sheets, a cutout may be formed on an edge of the inboard glass sheet to place electrodes therein. Such a cutout is often filled with sealing material such as urethane resin and silicone resin for sealing the electrodes. The surface defined by the sealing material is not so smooth as the glass surface, and is highly pliable and deformable. Therefore, the adhesive tape may not be able to attach to such a surface with an adequate strength. Furthermore, the surface of the sealing material may not be accurately shaped so that the seal member may not be correctly positioned in this region. If the sealing material should seep out to the edge of the laminated glass sheet, and create a rough edge, the correct positioning of the seal member may be prevented owing to the creation of a gap between the seal member and the edge of the laminated glass sheet and other reasons. The amount of the sealing material may be controlled so as to minimize the seeping out or the protrusion of the sealing material, but it increases the possibility of inadequately covering the electrodes with the sealing material. For these reasons, inclusion of a device such as a deicer in the laminated glass sheet may cause some difficulty in attaching the seal member thereto by using an adhesive tape.

The present invention was made in view of such problems of the prior art, and has a primary object to provide a window glass sheet fitted with a seal member and incorporated with a device such as a deicer which facilitates the device and the seal member to be installed in a proper manner.

Means to Accomplish the Task

To achieve such an object, the present invention provides an automotive window glass sheet (1) comprising a laminated glass sheet (2) including a first glass sheet (6) and a second glass sheet (8) placed on an outboard side of the first glass sheet, and a seal member (4) fitted on a peripheral part of the laminated glass sheet, the automotive window glass sheet further comprising: a cutout (11) formed on an edge of the first glass sheet across a thickness thereof; an electro-conductive pattern (13) formed on an inboard side (9) of the second glass sheet; an electrode (12) provided on a part of the inboard side of the second glass sheet corresponding to the cutout and connected to an end of the electro-conductive pattern; a lead wire (14) connected to the electrode (12); and a spacer (16) extending along an edge of the second glass sheet on the inboard side of the second glass sheet in a part thereof corresponding to the cutout and defining a flat and smooth inboard surface (22); wherein the inboard surface of the spacer is flush with a plane extrapolated from an inboard side of the first glass sheet, and the seal member is attached to a peripheral part of the inboard side of the first glass sheet and is attached to the inboard surface of the spacer in the cutout.

According to this arrangement, the cutout formed on an edge of the first glass sheet exposes the inboard side of the second glass sheet, and this creates a space exposing the inboard side of the second glass sheet to the interior of the vehicle body. By providing the spacer having a flat and smooth inboard surface on the inboard side of the second glass sheet, the seal member can be retained on the window glass sheet in a highly reliable manner. As the inboard surface of the spacer is flush with a plane extrapolated from an inboard side of the first glass sheet, the seal member can extend along both the inboard surface of the spacer and the inboard side of the first glass sheet in a linear fashion without being deflected in the thickness-wise direction of the window glass sheet. Therefore, no gap is created between the seal member and the inboard surface of the spacer or the inboard side of the first glass sheet so that the seal member can be securely attached to both the spacer and the first glass sheet.

According to another aspect of the present invention, sealing material is filled in a recess defined by the second glass sheet, the spacer and an edge of the cutout.

Thereby, the electrode can be sealed without preventing a favorable attachment between the seal member and the spacer or the first glass sheet.

According to yet another aspect of the present invention, the spacer is provided with a narrow section (21) which is recessed from a side of the electrode in a part thereof corresponding to the electrode, and the seal member is provided with a cutout (34) in a part thereof corresponding to the narrow section, the lead wire being passed through the cutout of the seal member.

This arrangement allows a space required for accommodating the electrode and the lead wire to be ensured.

According to yet another aspect of the present invention, each terminal end of the spacer abuts an end surface of the first glass sheet defining the cutout.

This arrangement maximizes the area over which the seal member is attached to the inboard surface of the spacer and the inboard side of the first glass sheet along the length of the seal member so that the seal member can be attached to the spacer and the first glass sheet in a highly even manner.

Effect of the Invention

According to the foregoing arrangements, in a laminated window glass sheet incorporated with a device such as a deicer and provided with an electrode affixed to the inboard side of the outboard glass sheet in a cutout formed on an edge of the inboard glass sheet, the seal member can be attached to the laminated glass sheet in a proper manner.

DESCRIPTION OF THE PREFERRED EMBODIMENT(S)

An automotive front windscreen glass sheet embodying the present invention is described in the following with reference to the appended drawings. In the following description, the various directions are based on the coordinate system indicated in each drawing.

Figure 1:
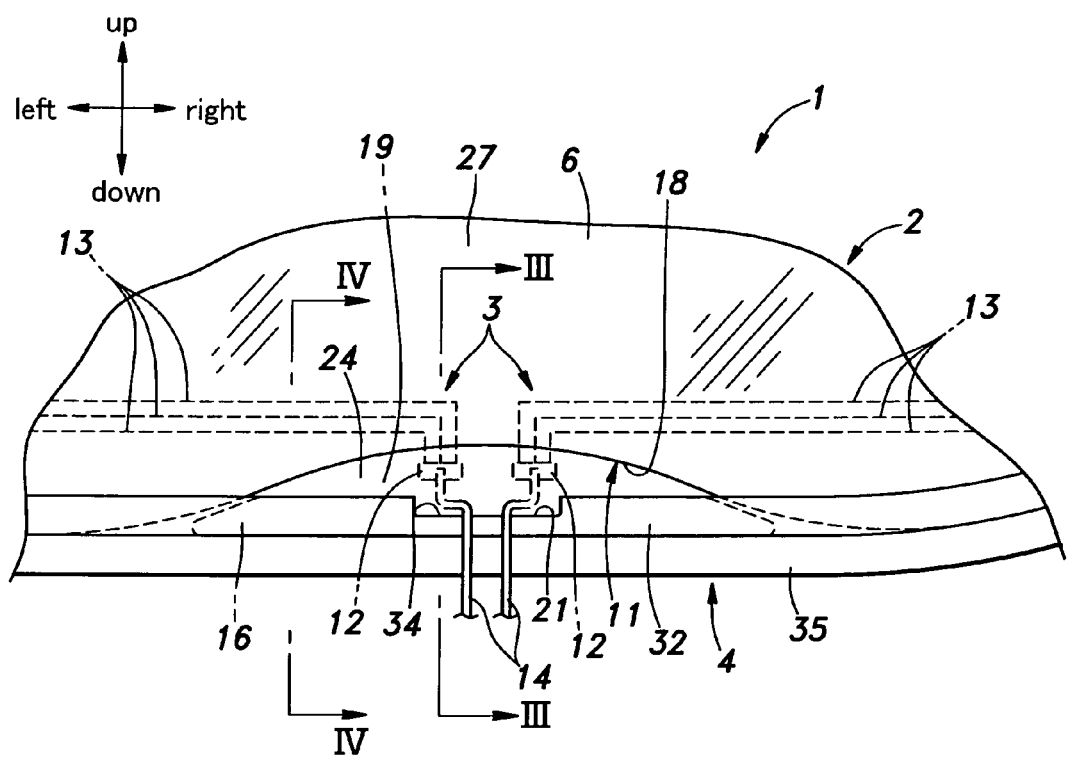
FIG. 1 is a view of a front windshield glass sheet embodying the present invention as seen from inside the vehicle.
Figure 2:
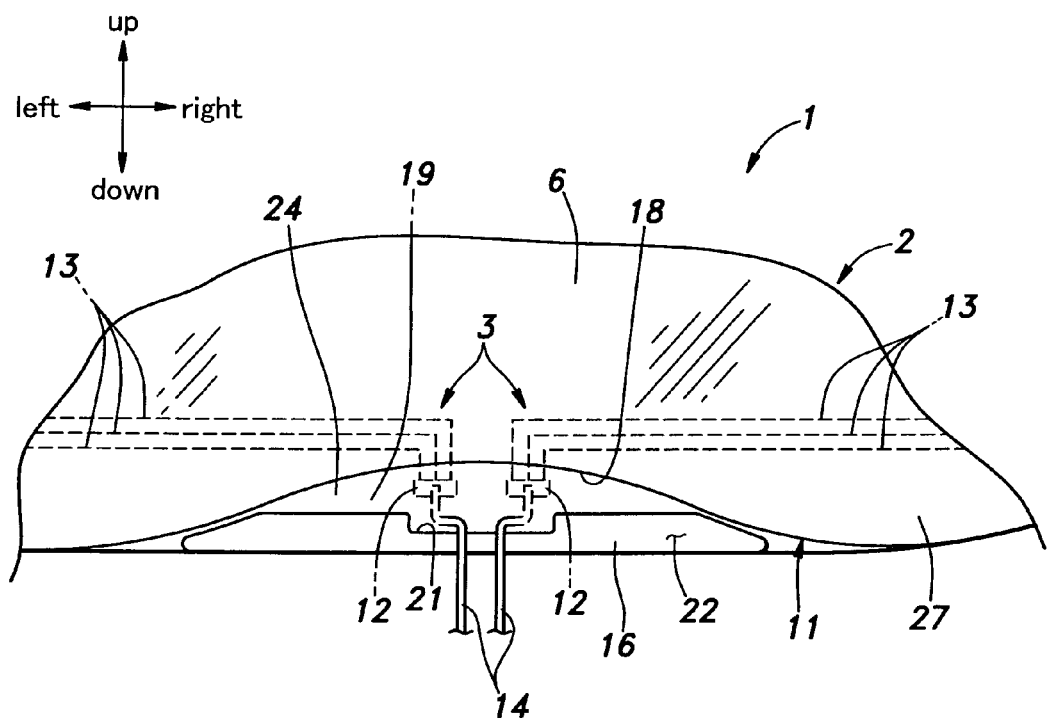
FIG. 2 is a view of the front windshield glass sheet as seen from inside the vehicle with the seal member removed therefrom.

As shown in FIGS. 1 and 2, the automotive front windscreen glass sheet 1 comprises a laminated glass sheet 2, a deicer 3 installed in the laminated glass sheet 2 and a seal member 4 attached to the peripheral edge of the laminated glass sheet 2.

Figure 3:
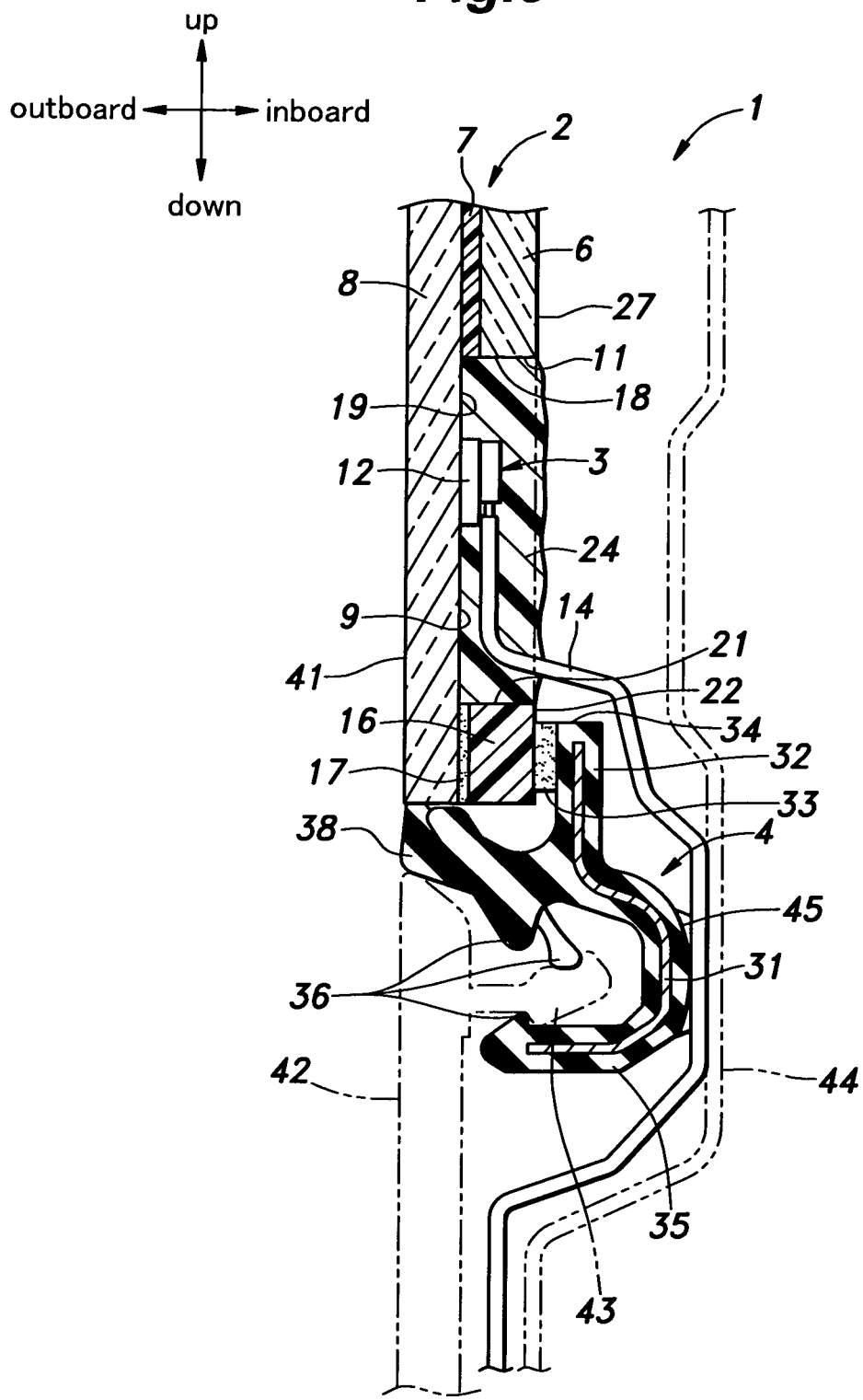
FIG. 3 is a sectional view taken along line III-III of FIG. 1.
Figure 4:
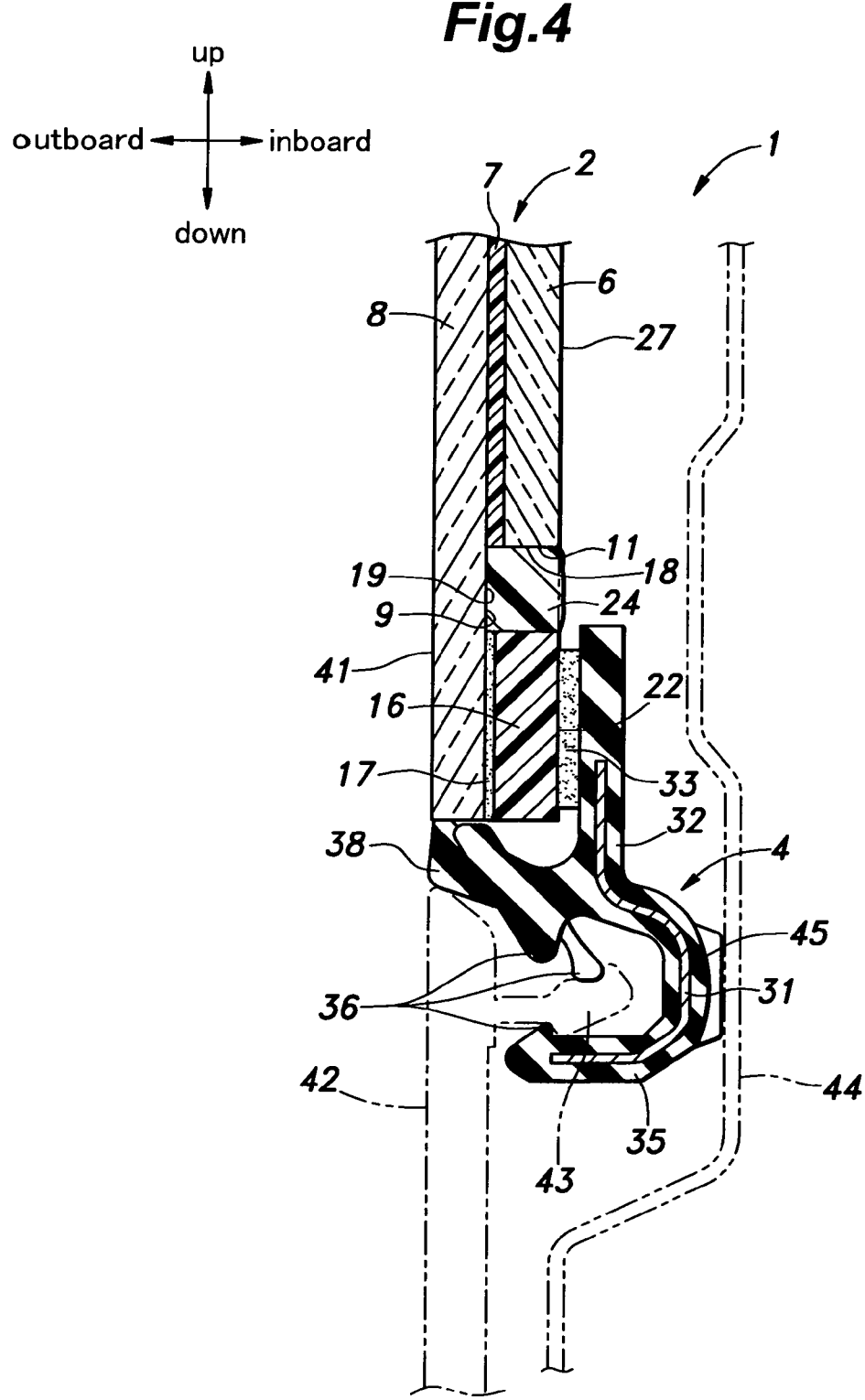
FIG. 4 is a sectional view taken along line IV-IV of FIG. 1.

As shown in FIGS. 3 and 4, the laminated glass sheet 1 includes a first glass sheet 6 located on the inboard side thereof, a second glass sheet 8 placed on the outboard side of the first glass sheet 6 via an interlayer 7. The first and second glass sheets 6 and 8 may consist of per se known float glass sheets, and the interlayer 7 may consist of a transparent plastic sheet made of PVB (polyvinyl butyral) or the like. The first glass sheet 6 is formed with a cutout 11 in a lower edge thereof. The cutout 11 is passed through the thickness of the first glass sheet 6, and is given with a crescent shape (a segment of a circle) defining an upwardly recessed region. Each lateral edge of the cutout 11 defines a smooth continuation of the cutout 11 to the remaining part of the lower edge of the first glass sheet 6. The interlayer 7 is also cutout in conformity with the cutout 11 so that the inboard side 9 of the second glass sheet 8 is exposed in the cutout 11.

A pair of electrodes (bus bars) 12 are formed on a part of the inboard side 9 of the second glass sheet 8 exposed in an upper part of the cutout 11. The inboard side 9 of the second glass sheet 8 exposed in the cutout 11 is additionally formed with a plurality of electro-conductive strips (or patterns) 13 extending into the part covered by the interlayer 7 and the first glass sheet 6. The example shown in FIGS. 1 and 2 includes two electrodes 12 formed on the second glass sheet 8, but three or any other number of electrodes may be provided. The electrodes 12 and the electro-conductive strips 13 can be formed by printing and curing silver paste on the inner side 9 of the second glass sheet 8, and are provided with a required electro-conductivity. The electrodes 12 and the electro-conductive strips 13 may be formed in the inboard side 9 of the second glass sheet 8 before the second glass sheet 8 is laminated to the first glass sheet 6 via the interlayer 7. A lead wire 14 connected to an onboard power source is soldered or otherwise connected to each electrode 12. Each lead wire 14 is covered by an electrically insulating sheath. The electro-conductive strips 13 generate heat by drawing electric power from the electric power source via the lead wires 14 and the electrodes 12 to heat the laminated glass 2.

As shown in FIGS. 2 to 4, a laterally elongated spacer 16 is attached to a lower part of the inboard side 9 of the second glass sheet 8 corresponding to the cutout 11 by using an adhesive tape 17. The spacer 16 may be molded from plastic material into a columnar shape having a rectangular cross section, and extends laterally. The shape of the spacer 16 is not limited by this example, but may also have a triangular cross section, or the shape of a cylinder having a flat surface formed on one side thereof. The spacer 16 extends long the lower edge of the inboard side 9 of the second glass sheet 8, and terminates slightly short of the end surface 18 of the cutout 11 (defined by the first glass sheet 6). Alternatively, each lateral end of the spacer 16 may abut the end surface 18 of the cutout 11. The spacer 17 and the end surface 18 of the cutout 11 jointly define a recess 19 whose bottom surface is defined by the inboard side 9 of the second glass sheet 8. The electrodes 12 are placed in this recess 19.

The spacer 16 includes a narrow section 21 defined by recessing a laterally middle part of the upper edge of the spacer 16 opposing the electrodes 12 so as to extend the recess 19 downwards in this region. The spacer 16 is provided with a smooth surface 22 on the inboard side thereof. The combined thickness of the spacer 16 and the adhesive tape 17 is substantially equal to the combined thickness of the first glass sheet 6 and the interlayer 7 so that the surface 22 of the spacer 17 facing inboard is flush with the inboard side 27 of the first glass sheet 6 or a plane extrapolated therefrom (as indicated by the double-dot chain-dot line of FIGS. 3 and 4).

The recess 19 jointly defined by the spacer 16 and the end surface 18 of the cutout 11 is filled with sealing material 24 consisting of urethane resin, silicone resin or the like. As a result, the electrodes 12, the electro-conductive strips 13, the electrodes 12 and the parts of the lead wires 14 connected to the corresponding electrodes 12 are sealed by this sealing material 24 while the remaining parts of the lead wires 14 extend out of the sealing material 24. The filling of the sealing material 24 into the recess 19 is carried out after the spacer 16 is fixedly attached to the second glass sheet 8, and the recess 19 is thereby formed.

The seal member 4 consists of a plastic member insert molded around an insert member 31. The plastic materials that may be used for the seal member 4 include olefin elastomers such as polyvinylchloride, thermoplastic elastomers such as styrene elastomers and rubber materials such as ethylene-propylene-diene rubber (EPDM), and polyphenylene oxide (PPO) is particularly preferred. The insert member 31 may consist of an elastic metallic member such as an aluminum member.

As shown in FIGS. 3 and 4, the seal member 4 is provided with a leg 32 extending laterally therefrom so as to oppose the lower edge of the inboard side 27 of the first glass sheet 6 and the inboard surface 22 of the spacer 16. The leg 32 extends linearly from the main body of the seal member 4 in the lateral direction, and extends along a fringe part of the inboard side 17 of the first glass sheet 6 across the inboard surface 22 of the spacer 16 in the peripheral direction. The leg 32 is attached to the lower edge of the inboard side 27 of the first glass sheet 6 and the inboard surface 22 of the spacer 16 by using an adhesive tape 33. The leg 32 extends downward beyond the lower edges of the first glass sheet 6 and the spacer 16 at the lower end thereof. As shown in FIG. 1, the leg 32 is formed with a cutout 34 corresponding in shape to the narrow section 21 of the spacer 16. The lead wires 14 extend from the electrodes 12 inward toward the interior of the vehicle body via the cutout 34. The cutout 34 prevents interference between the lead wires 14 and the leg 32.

The lower end of the leg 32 extends further downward while bulging in the inboard direction so as to define a U-shaped hook 35 having a convex surface (as seen in cross section) facing the inboard direction and an open end facing the outboard direction. The hook 35 is provided with a pair of engagement claws 36 which project toward each other from either side of the open end thereof. A lip 38 extends from the lower end of the leg 32 in the outboard direction. The lip 38 extends upward and in the outboard direction so as to define a convex surface as seen from the outboard side, and abuts the lower end surface of the second glass sheet 8 at the free end thereof under an elastic force. The outboard side of the lip 38 is substantially flush with the outboard side 41 of the second glass sheet 8. As shown in FIG. 4, the inboard side of the hook 35 abuts a vehicle body panel 44 which supports the front windshield glass sheet 1. As shown in FIG. 3, the inboard side of the hook 35 is formed with vertically extending grooves 45 for accommodating the lead wires 14.

The hook 35 is configured to engage an engagement piece 43 formed in a cowl top 42 which serves as a lid member for closing an upper opening of a cowl box (not shown in the drawing) provided between an engine hood (not shown in the drawings) and the lower edge of the front windshield glass sheet 1. The upper end of the outboard side of the hook 35 is substantially flush with the outboard side of the lip 38 and the outboard side 41 of the second glass sheet 8.

The insert member 31 extends inside the leg 32 and the hook 35 so as to maintain the shape of the hook 35.

The mode of operation of the front windshield glass 1 having the structure discussed above is now described in the following. In the illustrated embodiment, as the spacer 16 is provided on the inboard side 9 of the second glass sheet 8, and the sealing material 24 is filled into the recess 19 enclosed by the spacer 16 and the end surface 18 of the cutout 11, the spacer 16 serves as a dam for preventing the seeping out of the sealing material 24, and the sealing material 24 is prevented from seeping out of the lower end surface of the laminated glass sheet 2. Therefore, the end surface of the laminated glass sheet 2 can be maintained in an even condition so that the lip 38 can be brought into an intimate contact with the lower end surface. As the protrusion or the seeping out of the sealing material 24 can be favorably controlled, an adequate amount of sealing material 24 can be filled into the recess 19 so that an inadequate sealing of the electrodes 12 can be avoided.

In the illustrated embodiment, as the leg 32 of the seal member 4 is attached to the smooth surface 22 of the spacer 16 by using the adhesive tape 33, the leg 32 can be attached to the laminated glass sheet 2 in a reliable manner. Because the sealing material 24 is highly pliable, and may not provide a smooth outer surface, an adhesive tape 33 may not be securely attached to the surface of the sealing material 24. Because the spacer 16 is provided with a substantially same thickness as the first glass sheet 6, and the two ends thereof are placed adjacent to the opposing edge of the first glass sheet 6, the leg 32 of the seal member 4 is allowed to extend across the inboard side 27 of the first glass sheet 6 and the surface 22 of the spacer 16 linearly without suffering from any unevenness in the thickness-wise direction of the laminated glass sheet 2. Therefore, the leg 32 may be bonded to a planar surface jointly defined by the surface 22 of the spacer 16 and the inboard side 27 of the first glass sheet 6 so that no gap is created between the bonding surface of the seal member and the inboard surface of the spacer 16 or the inboard side 27 of the first glass sheet 6, and a highly secure attachment can be achieved.

As the spacer 16 is provided with the narrow section 21, the recess 19 is enlarged so that the freedom in the placement of the electrodes 12 is improved. As the leg 32 of the seal member 4 is provided with the cutout 34, the interference between the lead wires 14 extending from the electrodes 12 and the leg 32 can be voided.

This concludes the description of the preferred embodiment of the present invention, but the present invention is not limited by this embodiment, but may be modified in various ways without departing from the spirit of the present invention. The deicer 3 including the electrodes 12, the electro-conductive strips 13 and the lead wires 14 was incorporated in the laminated glass sheet 2 in the foregoing embodiment, but a per se known defogger or antenna device may be installed in the laminated glass sheet instead of the deicer. The narrow section 21 of the spacer 16 and the cutout 34 of the seal member 4 are not essential features for the present invention, and can be omitted insofar as the spacer 16 and the seal member 4 do not interfere with the electrodes 12 and the lead wires 14.

| 1 | automotive front windscreen glass sheet | | |
|---|---|---|---|
| 2 | laminated glass sheet | 3 | deicer |
| 4 | seal member | 6 | first glass sheet |
| 8 | second glass sheet | 9 | inboard side |
| 11 | cutout | 12 | terminal |
| 13 | electro-conductive strip | 14 | lead wire |
| 16 | spacer | 17 | adhesive tape |
| 18 | end surface | 19 | recess |
| 21 | narrow section | 22 | surface |
| 24 | sealing material | 27 | inboard side |
| 32 | leg | 33 | adhesive tape |
| 34 | cutout | 35 | hook |
| 37 | engagement claw | 38 | lip |

The invention claimed is:

1. An automotive window glass sheet comprising a laminated glass sheet including a first glass sheet and a second glass sheet placed on an outboard side of the first glass sheet, and a seal member fitted on a peripheral part of the laminated glass sheet, the automotive window glass sheet further comprising:
   a cutout formed on an edge of the first glass sheet across a thickness thereof;
   an electro-conductive pattern formed on an inboard side of the second glass sheet;
   an electrode provided on a part of the inboard side of the second glass sheet corresponding to the cutout and connected to an end of the electro-conductive pattern;
   a lead wire connected to the electrode; and
   a spacer extending along an edge of the second glass sheet on the inboard side of the second glass sheet in a part thereof corresponding to the cutout and defining a flat and smooth inboard surface;
   wherein the inboard surface of the spacer is flush with a plane extrapolated from an inboard side of the first glass sheet, and
   the seal member is attached to a peripheral part of the inboard side of the first glass sheet and is attached to the inboard surface of the spacer in the cutout.

2. The window glass sheet fitted with a seal member according to claim 1, wherein sealing material is filled in a recess defined by the second glass sheet, the spacer and an edge of the cutout.

3. The window glass sheet fitted with a seal member according to claim 1, wherein the spacer is provided with a narrow section which is recessed from a side of the electrode in a part thereof corresponding to the electrode, and the seal member is provided with a cutout in a part thereof corresponding to the narrow section, the lead wire being passed through the cutout of the seal member.

4. The window glass sheet fitted with a seal member according to claim 2, wherein the spacer is provided with a narrow section which is recessed from a side of the electrode in a part thereof corresponding to the electrode, and the seal member is provided with a cutout in a part thereof corresponding to the narrow section, the lead wire being passed through the cutout of the seal member.

5. The window glass sheet fitted with a seal member according to claim 1, wherein each terminal end of the spacer abuts an end surface of the first glass sheet defining the cutout.

6. The window glass sheet fitted with a seal member according to claim 2, wherein each terminal end of the spacer abuts an end surface of the first glass sheet defining the cutout.

7. The window glass sheet fitted with a seal member according to claim 3, wherein each terminal end of the spacer abuts an end surface of the first glass sheet defining the cutout.

8. The window glass sheet fitted with a seal member according to claim 4, wherein each terminal end of the spacer abuts an end surface of the first glass sheet defining the cutout.

9. The window glass sheet fitted with a seal member according to claim 1, wherein the second glass sheet, the spacer and an edge of the cutout define a recess and the electrode is placed in the recess.

* * * * *